United States Patent
Boldo

(10) Patent No.: US 7,719,866 B2
(45) Date of Patent: May 18, 2010

(54) CONTROL CIRCUIT FOR A DC-TO-DC SWITCHING CONVERTER, AND THE USE THEREOF FOR MAXIMIZING THE POWER DELIVERED BY A PHOTOVOLTAIC GENERATOR

(75) Inventor: Pablo Rueda Boldo, Katwijk (NL)

(73) Assignee: Agence Spatiale Europeenne, Paris Cedex (FR)

( * ) Notice: Subject to any disclaimer, the term of this patent is extended or adjusted under 35 U.S.C. 154(b) by 1020 days.

(21) Appl. No.: 11/415,827

(22) Filed: May 2, 2006

(65) Prior Publication Data

US 2007/0024257 A1  Feb. 1, 2007

(30) Foreign Application Priority Data

May 2, 2005  (FR)  ................... 05 04441

(51) Int. Cl.
*H02M 3/335* (2006.01)
(52) U.S. Cl. .............. 363/89; 363/97; 323/282; 323/906
(58) Field of Classification Search .......... 323/222, 323/272, 273, 277, 259, 282–290, 268, 269; 363/41, 65, 49, 16–17, 98, 132, 89, 97; 307/23, 307/43, 44, 125
See application file for complete search history.

(56) References Cited

U.S. PATENT DOCUMENTS 4,163,194 A * 7/1979 Ross .................. 324/767
4,929,882 A * 5/1990 Szepesi .................. 323/222

FOREIGN PATENT DOCUMENTS

DE    41 01 594 A1    7/1992
DE    198 37 862 A1    3/2000

OTHER PUBLICATIONS

Garrigos A. et al., "System model of the sequential switching shunt series regulator for spacecraft regulated high power busses", *Power Electronics Specialists Conference*, 2004, pp. 3645-3650.
Perol P., "Another look at the sequential switching shunt regulator", *Proceedings of the European Space Power Conference*, vol. 1, Sep. 21, 1998, pp. 79-84.

* cited by examiner

*Primary Examiner*—Rajnikant B Patel
(74) *Attorney, Agent, or Firm*—Alston & Bird LLP

(57) ABSTRACT

A control circuit for a switching DC/DC Converter comprising: an input for an indicator signal indicative of an output current level from said converter; a peak detector for detecting and storing a maximum value of said indicator signal; a comparator element for comparing an instantaneous value of said indicator signal with said stored maximum value, and for generating a switching signal when said instantaneous value becomes less than a predetermined fraction of said stored value; reinitializer means for reinitializing said peak detector in response to said switching signal; and means for generating a control signal that switches between a state in which it increases over time and a state in which it decreases over time in response to said switching signal. A control module for photovoltaic generator, the module including such a control circuit, and a photovoltaic generator system comprising a plurality of such modules, each controlling a respective photovoltaic generator.

12 Claims, 4 Drawing Sheets

CONTROL CIRCUIT FOR A DC-TO-DC SWITCHING CONVERTER, AND THE USE THEREOF FOR MAXIMIZING THE POWER DELIVERED BY A PHOTOVOLTAIC GENERATOR

The invention relates to a control circuit for a DC-to-DC switching converter, and to its application to controlling a photovoltaic generator. The invention is intended mainly but not exclusively for space applications.

BACKGROUND OF THE INVENTION

Satellites and space probes generally include photovoltaic generators for powering on-board equipment and for charging batteries that deliver power during periods of eclipse. The photovoltaic generators, the batteries, and the various items of equipment that need to be powered are connected to one another by a power supply bus bar that presents a potential that needs to be kept within a predetermined range. Regulators are provided for controlling the magnitude of the currents delivered by said photovoltaic generators, in particular as a function of the potential of said power supply bus bar.

The regulator in the most widespread use is the sequential switching shunt regulator (S3R or $S^3R$) as developed by the European Space Agency and as described in the article "The sequential switching shunt regular $S^3R$" by D. O'Sullivan and A. Weinberg, Proceedings of the Third ESTEC Spacecraft Power Conditioning Seminar, Noordwijk, the Netherlands, Sep. 21-23, 1977. That regulator comprises a plurality of individual photovoltaic generators connected in parallel to feed a power supply bus bar. Each individual generator can be selectively short-circuited by a controlled switch, and under such circumstances the current it generates is no longer supplied to the bus bar, but is dissipated; the various short-circuit switches are switched ON or OFF as a function of the potential of the power supply bus bar, and with the help of hysteresis comparators having thresholds that are offset from one another. Thus, the lower the potential of the bus bar, indicative of high consumption by the equipment being powered and/or of a low level of charge in the batteries, the greater the number of individual generators that are connected to said bus bar. Conversely, when the potential of the bus bar is high, generators are short-circuited, which means that there is excess power available.

The $S^3R$ regulator constitutes an excellent compromise between the requirements for effectiveness and for simplicity, however it does not make it possible to optimize the use of the power available from the photovoltaic generators. Such generators present a V-I characteristic curve that presents an optimum operating point at which the power extracted is maximized; in order to operate at this optimum operating point, each generator must be connected to a load that presents a determined input impedance. However the problem is made much more complex by the fact that the characteristic curves vary very greatly with aging of the generators, and also depend strongly on temperature. That is why, if it is desired to make optimum use of the available power, which is very important in particular for interplanetary missions directed to the outer regions of the solar systems, it is necessary to provide a control system that makes it possible to "track" the maximum power operating point, with this being known as maximum power point tracking (MPPT).

In conventional manner, MPPT systems use microprocessor-based controllers, but that is generally not desirable in space applications, in particular for reasons of reliability. That is why analog MPPT controllers have been developed in the past, but until now none of them has given complete satisfaction.

The articles "Electrical power subsystem of Globastar" by W. Denzinger, Fourth European Space Power Conference 1995, and "Power conditioning unit for Rosetta/Mars Express" by H. Jensen and J. Laursen, Proceedings of the Sixth European Space Power Conference 2002, describe systems based on the principle that at the maximum power point, the absolute value of the dynamic impedance dV/dI of a generator is equal to its static impedance V/I. This makes it possible to avoid multiplying voltage and current values, and consequently to limit the complexity of the circuit. Nevertheless, circuit complexity remains excessive for providing independent control of a large number of individual generators. Thus, a plurality of solar arrays need to be connected in parallel and controlled together; this limits the effectiveness of the system and makes it necessary to use protection and isolation systems in order to avoid faults propagating.

U.S. Pat. No. 4,794,272 discloses an MPPT system that makes use of a different concept, namely maximizing the output current from a DC/DC switching converter (an array power regulator (APR)) connected between the photovoltaic generators and the power supply bus bar. This simplification is possible because the output voltage from the APR converter is equal to the potential of the power supply bus bar, which can be considered as being approximately constant. Nevertheless, such a system requires means for modifying the operating points in order to cause it to oscillate about its maximum value, thereby preventing the complexity of the electronic circuit from being reduced significantly.

U.S. Pat. No. 6,316,925 discloses another MPPT system that controls a voltage converter in order to maximize the output voltage by using operations of sampling and comparing output current values. Such a system presents the drawback of being synchronous (the sample-and-hold circuit is driven by a clock), thereby limiting its performance. Good tracking of the optimum operating point can be obtained only by using slow oscillations around said optimum point, but that implies a long acquisition time in order to come close thereto.

Furthermore, the above two documents disclose in conventional manner, the use of a buck converter (a voltage-reducing switching converter) as the APR converter. That presents three major drawbacks:

firstly, it is necessary to use high voltage solar generators (operating at several tens of volts (V) and up to more than 100 V), thus running a major risk of failure due to electric arcs forming in operation:

secondly, a buck switching converter includes a controlled switch (typically a metal oxide on silicon field effect transistor (MOSFET)) connected in series with each generator; as a result, in the event of the switch failing, the generator is permanently isolated from the power supply bus bar;

and thirdly, when the switch of a buck switching converter is constituted by a MOSFET, the MOSFET must be controlled by a floating driver circuit, thereby increasing the number of electronic components that are needed.

The article by A. Boehringer and J. Haussmann entitled "Dynamic behavior of power conditioning systems for satellites with a maximum power point tracking system", published in the Proceedings of the Spacecraft Power Conditioning Electronic Seminar, ESTEC Noordwijk, the Netherlands, July 1972, describes an MPPT system based on the above-mentioned "dV/dI=V/I" concept and using a step-up switching converter operating at the limit between discontinuous and continuous conditions.

OBJECTS AND SUMMARY OF THE INVENTION

An object of the present invention is to mitigate at least one of the drawbacks of the prior art. In particular, the invention makes it possible to obtain an MPPT system which, while presenting good performance and good reliability, is sufficiently simple to enable a plurality of individual generators to be controlled independently, thereby improving the overall effectiveness of the photovoltaic generator system and relaxing requirements in terms of protecting and isolating said individual generators. In addition, the invention preferably uses a step-up switching converter as the converter power stage, thereby subsequently improving the reliability of the photovoltaic generator system.

The invention thus provides a control circuit for a DC/DC switching converter, the control circuit comprising:
- an input for an indicator signal indicative of an output current level from said converter;
- a peak detector for detecting and storing a maximum value of said indicator signal;
- a comparator element for comparing an instantaneous value of said indicator signal with said stored maximum value, and for generating a switching signal when said instantaneous value becomes less than a predetermined fraction of said stored value;
- reinitializer means for reinitializing said peak detector in response to said switching signal; and
- means for generating a control signal that switches between a state in which it increases over time and a state in which it decreases over time in response to said switching signal.

In particular embodiments:
said control signal varies linearly with time; and
the circuit also includes an input for an activation/deactivation signal, and when a deactivation signal is present at said input, said control signal is held in a saturated state.

The invention also provides a control module for a photovoltaic generator, the control module comprising:
- a switching converter connecting said photovoltaic generator to a power supply bus bar;
- a current detector for generating an indicator signal indicative of an output current from said converter;
- a driver circuit connected to said receive a control signal as an input and to generate a signal for driving said DC/DC converter as a function of said control signal; and
- a control circuit as defined above, connected to receive said indicator signal as an input and to generate on its output a first control signal for the driver circuit.

In particular embodiments:
said DC/DC converter is a step-up switching converter;
said driver circuit comprises a pulse width modulator for generating a driver signal having a duty cycle determined by said control signal;
the module also comprises a current-control circuit for generating a second control signal for said driver circuit such that the output current from said DC-to-DC converter is maintained at a target level that increases with decreasing value of the potential of said power supply bus bar; and in which said control circuit and said current-control circuit are connected to said driver circuit in such a manner as to receive as input that one of said first and second control signals that determines generating the driver signal that corresponds to the higher level for the output current from said DC/DC converter;
said current-control circuit is a conductance control circuit;
said current-control circuit includes a limiter circuit for limiting the value of said second control signal for said driver circuit in such a manner that said target level for the output current from the DC/DC converter cannot exceed a limit value regardless of the value of the potential of said power bus bar;
the module also comprises an activator and deactivator circuit for generating a signal for activating said control circuit when the value of the potential of said power supply bus bar drops below an activation threshold, and for generating a signal for deactivating said control circuit when the value of the potential of said power supply bus bar rises above a deactivation threshold, higher than said activation threshold.

The invention also provides a photovoltaic generator system comprising a plurality of individual photovoltaic generators that are isolated from one another and connected to a common power supply bus bar via respective control modules of the invention, in which:
the circuits for activating and deactivating each module presents different values for said activation and deactivation thresholds; and
said activation threshold, for all of the modules, is less than the value of the potential of said power supply bus bar at which said target level for the output current from said DC/DC Converter is equal to said predetermined limit value.

The invention also provides a method of controlling a switching DC/DC Converter in such a manner that its output current oscillates about its maximum value, the method comprising the following operations:
generating a control signal for controlling said DC/DC Converter, which control signal can present a state in which it increases over time or a state in which it decreases over time;
continuously acquiring an indicator signal indicative of an output current level from said DC/DC Converter;
continuously detecting a peak value of said indicator signal and storing it in a storage element;
continuously comparing the present value of said indicator signal with said stored peak value; and
when said present value is less than a first predetermined fraction of said stored peak value:
reinitializing said storage element; and
switching said control signal between said state of increasing relative to time and said state of decreasing relative to time.

BRIEF DESCRIPTION OF THE DRAWINGS

Other characteristics, details, and advantages of the invention appear on reading the following description made with reference to the accompanying drawings, given by way of example, and showing.

MORE DETAILED DESCRIPTION

Figure 1:
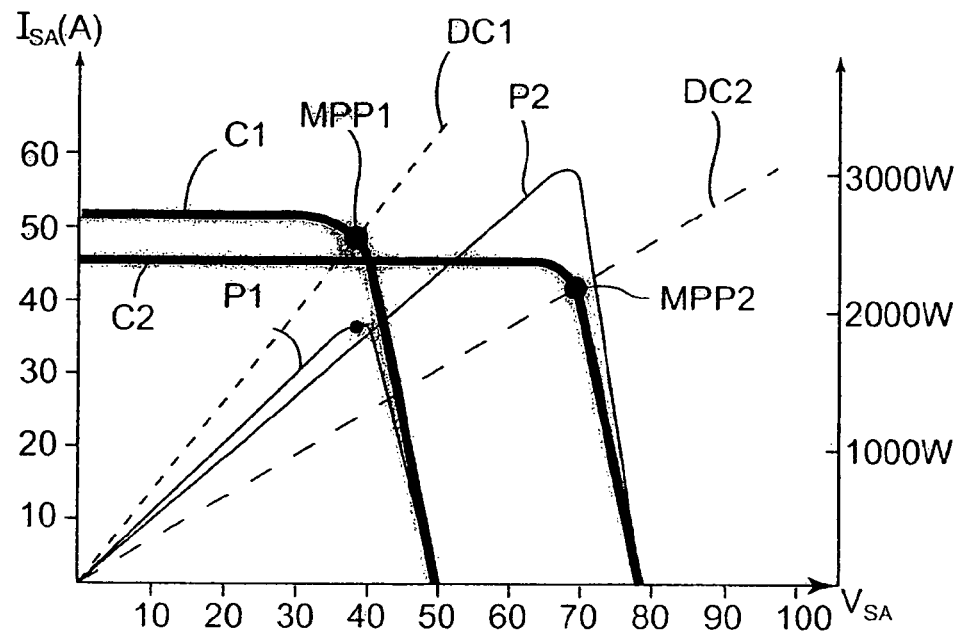
FIG. 1, two examples of characteristic curves for a solar generator at different temperatures.

FIG. 1 shows examples of characteristic curves for photovoltaic generators. More precisely, the thick-lined curves C1 and C2 represent the relationship between the voltage $V_{SA}$ and the output current I for a generator at respective temperatures of 45° C. and of −90° C. At both temperatures, the characteristic curves present a first region of approximately constant current followed by a second region of approximately constant voltage in which the current drops off rapidly to zero for a small increase in voltage. The power generated is given by the relationship $P_{SA}=I_{SA}(V_{SA})\cdot V_{SA}$, and is represented by the fine-lined curves P1 and P2. The optimum operating point MPP1, MPP2 corresponds to generating maximum power and is situated in the region of the inflexion in the characteristic curves C1, C2: it is of interest to observe that these points correspond neither to maximum current nor to maximum voltage. The reciprocals of the slopes of the load lines CT1 and CT2 passing through the origin of the axes and through the respective points MPP1 or MPP2, give the values of the impedance of the load that should be connected to the output of the photovoltaic generator in order to extract maximum power therefrom. It will readily be understood that because of the temperature variations to which photovoltaic generators are subjected, in particular in the context of space applications, using a load of constant resistance does not enable the available power to be used with maximum effectiveness. Other major variations in the characteristic curves are due to the generators aging.

That is why it is known to use a voltage converter to match the impedance in such a manner as to "track" the operating point that enables maximum power to be extracted from the generator, at least whenever that is made necessary by the state of charge of the batteries and by the power demand from the equipment powered by the power bus bar. The voltage converter is generally a voltage-lowering (buck) or voltage-raising (step-up) switching converter presenting a conversion ratio that is determined by a control circuit that seeks to maximize the power extracted.

Figure 2:
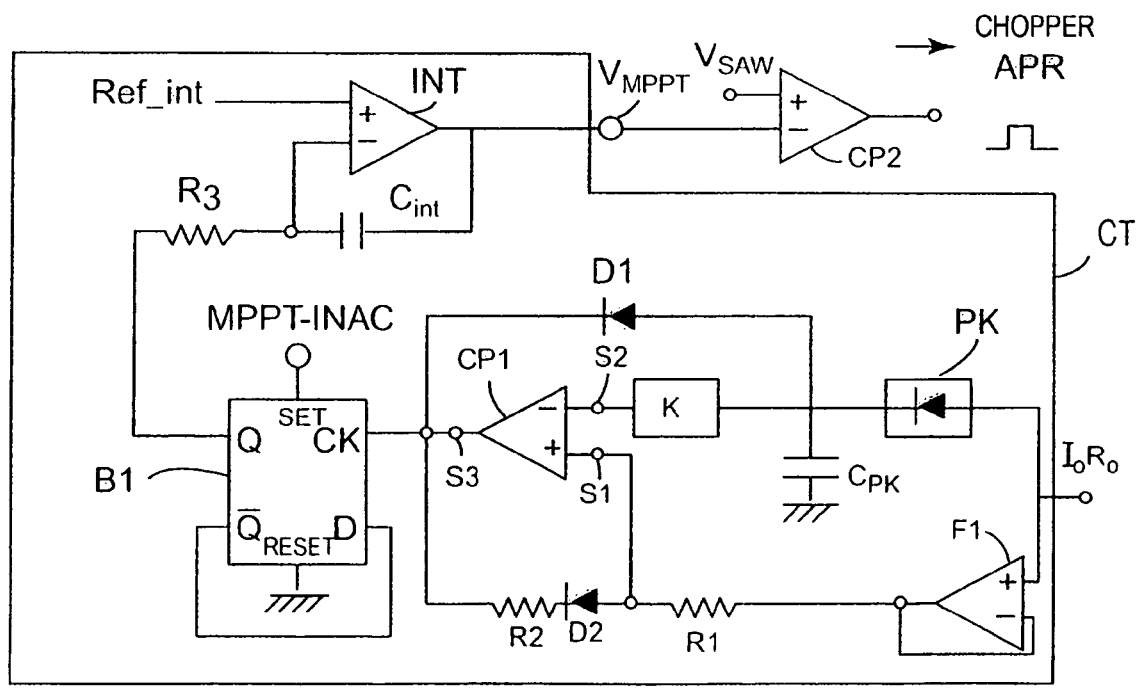
FIG. 2, a simplified electrical schematic diagram of a circuit for controlling a switching DC/DC Converter of the invention.

FIG. 2 is a simplified electrical schematic of a control circuit CT of the invention, which receives as an input a voltage signal $I_0R_0$ presenting a value that is proportional to the output current from the DC/DC converter (where $R_0$ is a gain that has the dimensions of resistance) and that generates at its output a control signal $V_{MPPT}$. A comparator CP2 not forming part of the control circuit CT proper, serves to compare $V_{MPPT}$ with a sawtooth signal $V_{SAW}$ that is generated locally; the output from the comparator CP2 is a squarewave signal that drives a switching converter APR presenting a duty cycle D (fraction of the period during which the signal is at a "high" value) that is proportional to $V_{MPPT}$. The comparator CP2 constitutes a pulse width modulator. The voltage $V_0$ and the current $I_0$ at the output from a switching converter depend on the duty cycle; in particular, for a step-up switching converter that is ideal (lossless), the following apply:

$$I_0=(1-D)I_{SA}$$

$$V_0=V_{SA}/(1-D)$$

where $V_{SA}$ and $I_{SA}$ are respectively the voltage and the current input to the switching converter, i.e. the voltage and the current at the terminals of the photovoltaic generator.

The signal $I_0R_0$ input to the control circuit CT is applied to the input of a peak detector PK which charges a capacitor $C_{PK}$; in the simplified schematic, PK is represented as a simple diode, but it is preferably implemented in the form of an active circuit, in known manner. At each instant, the potential difference across the terminals of said capacitor $C_{PK}$ is thus equal to the maximum value that has been taken by the signal $I_0R_0$ since the most recent reinitialization of the peak detector; this potential difference is multiplied by a factor K<1 (typically in the range 0.95 to 0.99, e.g. equal to 0.97) and is applied to the inverting input of a comparator CP1; the non-inverting input of the comparator has a signal applied thereto that is equal to $I_0R_0$ when the output from the comparator CP1 is high (diode D2 non-conductive) and equal to a value that is less than $I_0R_0$ when the output from the comparator CP1 is low (diode D2 conductive and voltage divided by resistors R1 and R2). An operational amplifier F1 connected as a voltage follower, although not essential is nevertheless useful in ensuring that the value of the input signal $I_0R_0$ is not disturbed.

The operation of the control circuit CT is described in detail below. Understanding is made easier on examining FIG. 3 which shows, amongst other things, the way in which signals S1, S2, and S3 vary over time, which signals correspond respectively to the non-inverting input, to the inverting input, and to the output of the comparator CP1.

Consideration is given initially to circumstances in which the input signal $I_0R_0$ increases over time and the comparator CP1 presents an output S3 that is high. Under such circumstances, the signal S2 at the inverting input of CP1 is equal to $KI_0R_0$ (K=0.97<1), since the instantaneous value of $I_0R_0$ coincides with its peak value, and the signal S1 at the non-inverting input is equal to $I_0R_0$ since the diode D2 is non-conductive and thus no current is flowing through the voltage divider R1/R2; this situation is compatible with the initial assumption that the output from the comparator is high. It can be seen that the diode D1 connecting the capacitor $C_{PK}$ to the output of the comparator CP1 is also non-conductive: as a result the capacitor cannot discharge.

At an instant t1, $I_0R_0$ begins to decrease: the signal S1 at the non-inverting input CP1 also decreases, while the signal S2 at its inverting input remains constant: $S2=K\cdot max(I_0R_0)$. At an instant t2, the instantaneous value of $I_0R_0$ drops below $S2=K\cdot max(I_0R_0)$ and the output S3 of the comparator CP1 switches to its low level. At this instant, the diodes D1 and D2 become conductive: the signal S1 of the non-inverting input of CP1 goes from $I_0R_0$ to $I_0R_0\cdot R2/(R1+R2)$, and the capacitor $C_{PK}$ discharges quickly through D1, thereby reinitializing the peak detector. When at an instant t3 the voltage S2 at the inverting input of CP1 drops below $S1=I_0R_0\cdot R2/(R1+R2)$, the output S3 of the comparator returns to a high level and causes the diodes D1 and D2 to become non-conductive. The capacitor $C_{PK}$ can then start to charge again until at instant t4 it "catches up" with the input signal $I_0R_0$.

In conclusion, while the instantaneous value of the signal $I_0R_0$, indicative of an output current level from the converter APR, becomes less than a predetermined threshold K of its maximum value, as stored by the capacitor $C_{PK}$ of the peak detector PK:

said peak detector PK is reinitialized by the capacitor $C_{PK}$ discharging through the diode D1; and a pulse S3 is generated at the outlet from the comparator CP1.

The output S3 of the comparator CP1 is connected to the clock input CK of a D type bistable B1, having its D input connected to its $\overline{Q}$ output. When the bistable B1 receives the pulse S3 coming from the comparator CP1 on its clock input CK, the signal present at its Q output goes from a high level to a low level, or vice versa. It is assumed that prior to the rising front of the pulse S3 (t≦t3) Q is low, and that for t>t3, Q passes to a high level (see FIG. 3).

The Q output of the bistable B1 is delivered at an input to an integrator INT, essentially constituted by an operational amplifier, a capacitor $C_{INT}$, and a resistor R3. A reference voltage Ref_int of value intermediate between the high and low values of Q is applied to the inverting input of the integrator. Mere inspection of the circuit shows that when Q is high, the signal $V_{MPPT}$ at the output from the integrator decreases linearly, in other words it presents a waveform of downward slope, and while Q is low, the signal $V_{MPPT}$ increases linearly, in other words it presents a waveform of rising slope.

The signal $V_{MPPT}$ constitutes a control signal for the voltage converter APR since its value acting via the comparator CP2 determines the duty cycle D of the squarewave signal that drives said converter, and thus determines the operating point of the photovoltaic generator connected to its input.

The overall operation of the circuit is considered below. Initially, for t<t1, Q is low and the control signal $V_{MPPT}$ increases linearly over time, progressively reducing the duty cycle D of the signal driving the converter APR. It is assumed initially that D>$D_{opt}$, $D_{opt}$ being the optimum duty cycle enabling the highest output current $I_0$ to be obtained (which corresponds approximately to maximum power, since the voltage of the power supply bus bar to which the output of the converter is connected varies very little); it follows that the signal $I_0R_0$ increases likewise over time. At instant t1, D becomes equal to $D_{opt}$, and then it drops below this optimum value, thereby causing the output current to decrease, and thus causing $I_0R_0$ to decrease. At instant t2, $I_0R_0$ has dropped far enough below its maximum value to trigger reinitialization of the peak detector PK and to generate a pulse at the output of CP1. At instant t3, this pulse cause the bistable B1 to change state: the output Q goes to the high level, $V_{MPPT}$ begins to decrease linearly, D again returns towards $D_{opt}$, and the output current $I_0$ from the converter begins to increase again. In this way, the output current $I_0$ oscillates about its maximum value, which corresponds to the fact that the operating point of the photovoltaic generator oscillates about its maximum power point (MPP1, MPP2 in FIG. 1). The frequency of the oscillation depends in particular on the capacitance of the capacitor $C_{int}$; in the example of FIG. 3, this frequency is equal to about 150 hertz (Hz).

From a more general point of view, it should be considered that the assembly comprising the bistable B1 and the integrator INT constitutes means for generating a control signal $V_{MPPT}$ that is time-dependent, and that switches between a state in which it increases over time and a state in which it decreases over time in response to the switching signal S3 generated by the comparator CP1. Terms such as "increasing" and "decreasing" should be understood broadly: in other embodiments of the invention, $V_{MPPT}$ could present frequency modulation, for example: under such circumstances, it would be its frequency that increases and decreases, and not its amplitude. The essential point is that after receiving the switching signal, the operating point of the generator changes the direction in which it travels along the characteristic curve.

Figure 3:
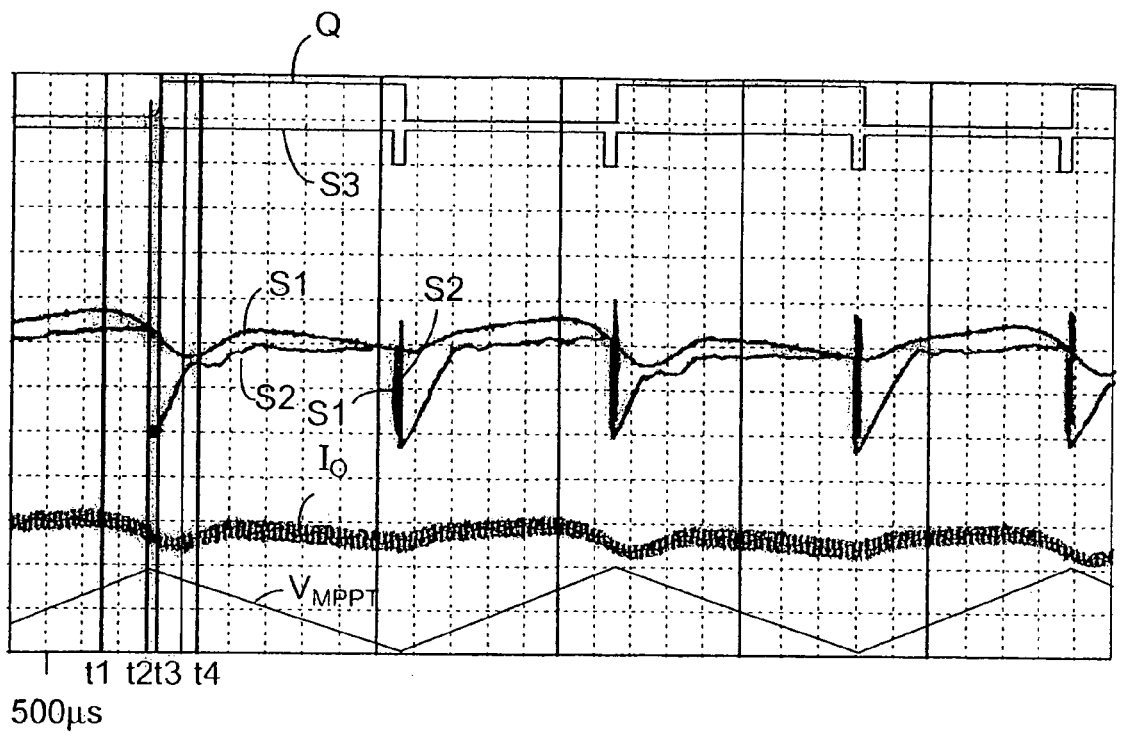
FIG. 3, waveforms illustrating the operation of the circuit of FIG. 2.

On a close examination of FIG. 3, it can be seen that the output current $I_0$ and the signal $I_0R_0$ do not begin to increase immediately after the bistable B1 has switched. This effect is due mainly to the fact that the transfer function $I_0/D$ of the voltage converter APR presents a right-half-plane zero effect at high frequencies. Because of this delay in the response of $I_0$, it necessary to ensure that the capacitor $C_{PK}$ does not recharge too quickly, so that the voltage at this terminal cannot "catch up" with the signal $I_0R_0$ while it is still decreasing, since that would lead to untimely switching of the bistable. By way of example, a satisfactory charging time has been obtained using a capacitor $C_{PK}$ having a capacitance of 220 nanofarads (nF) and charging it through a resistance of 1 kilohm (kΩ) connected in series with the peak detector PK. The person skilled in the art can easily modify these values in order to adapt them to various embodiments of the invention.

A signal MPPT-INAC can be applied to the "SET" input of the bistable B1, thereby forcing its Q output to the high value. Consequently, $V_{MPPT}$ decreases until the integrator INT becomes negatively saturated: MPPT-INAC is thus a signal for inactivating the control circuit CT. Naturally, in another embodiment of the invention, the circuit CT could be inactivated by bringing $V_{MPPT}$ to its positive saturation level.

In practice, the control circuit CT forms part of a control module for a photovoltaic generator. It is not always necessary to extract maximum power from each generator, so it is necessary to provide another control circuit suitable for adjusting the current that is generated. In addition, auxiliary functions of reinitializing and activating/deactivating the circuit CT are needed in order to ensure that the module operates properly under all circumstances.

Figure 4:
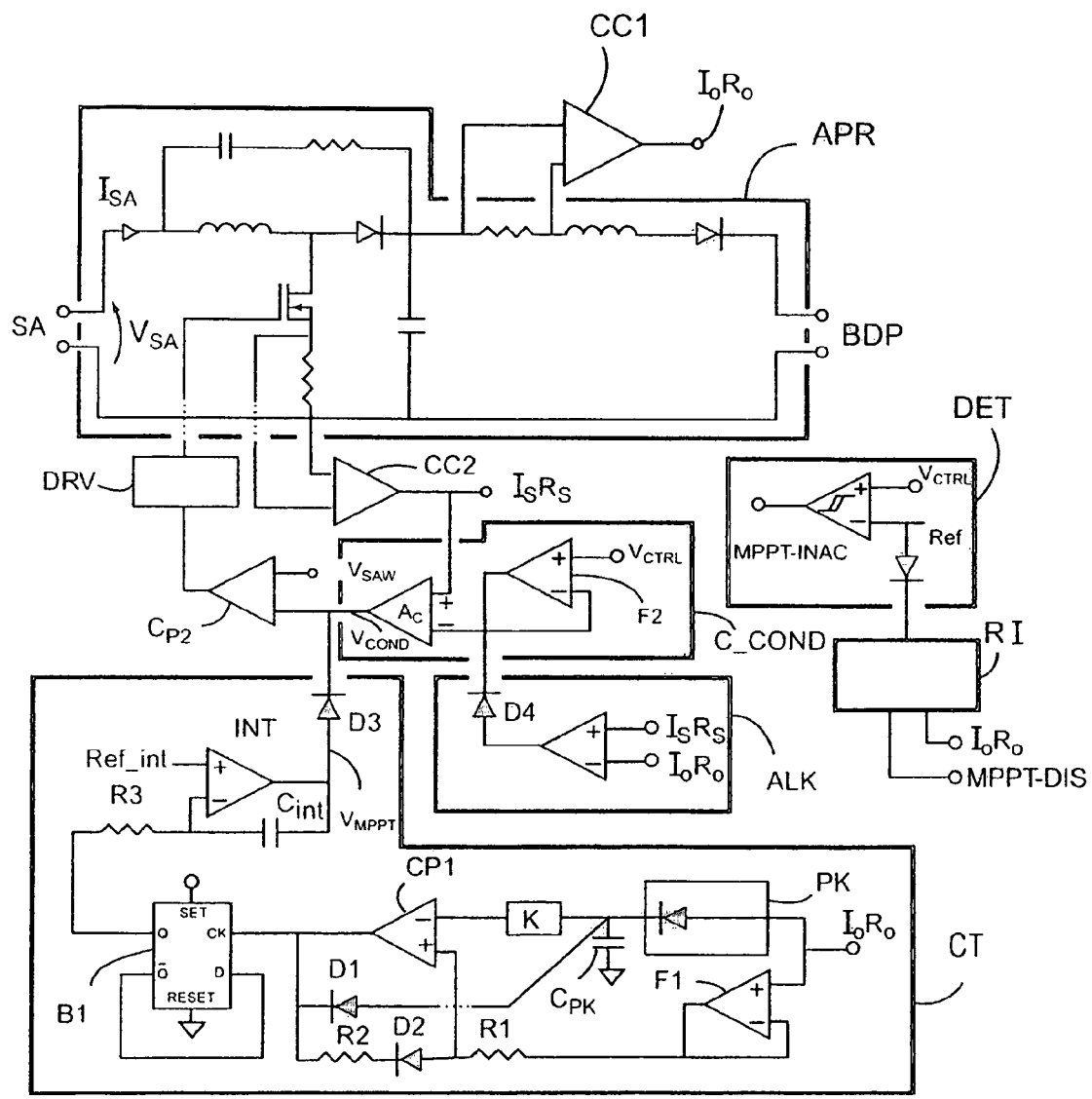
FIG. 4, a simplified electrical schematic diagram of a control module for a photovoltaic generator of the invention, in particular including the circuit of FIG. 2.

The control module shown in FIG. 4 includes in particular a current-control circuit C_COND that enables the DC/DC converter APR to be controlled in linear manner as a function of the potential of the power supply bus bar (referenced BDP). In other words, the current-control circuit C_COND generates a second control signal $V_{COND}$ for the driver circuit constituted by the comparator CP2 and the driver stage CRV, such that the output current $I_0$ from the converter APR is maintained at a target level, which level rises with decreasing potential of the power supply bus bar (and thus of $V_{CTRL}$). In particular, it is advantageous to use a current-control circuit based on the conductivity control principle as described for example in the article by D. O. Sullivan, H. Spruijt, A. Crausaz, published in ESA Journal 1989, Vol. 13, pp. 33-46, and in particular because of the width of its passband; nevertheless, other control techniques could validly be used, such as peak current control mode. The current-control circuit receives as an input a voltage signal $V_{CTRL}$ that is proportional to the difference between the potential of the power supply bus bar BDP and a reference signal. An error amplifier Ac compares $V_{CTRL}$ with a signal $I_SR_S$ that is proportional to the current passing through the controlled switch of the voltage converter APR. The signal $V_{COND}$ taken from the output of the amplifier Ac is delivered to the input of the comparator CP2 that determines duty cycle D of the signal driving the converter APR. In practice, the duty cycle D decreases with decreasing $V_{CTRL}$, thus having the effect of increasing the current $I_0$ delivered by the step-up switching converter APR to the power supply bus bar BDP, at least so long as the operating point of the photovoltaic generator (referenced SA in FIG. 4, for "solar array") remains in the (approximately) constant-current region of the characteristic curve of said photovoltaic generator (horizontal region in the graph of FIG. 1).

If the signal $V_{CTRL}$ drops below a certain level, then the operating point of the photovoltaic generator reaches the "constant-voltage" region. At this point, a reduction in D causes $I_0$ to decrease and not to increase. Consequently, whatever the actual value of $V_{CTRL}$, it is necessary for the voltage at the inverting input of the error amplifier Ac to be prevented from dropping below a certain value that depends on $I_0R_0$ and on $I_SR_S$. This function is performed by an "antilocking" circuit ALK which calculates the instantaneous value of $k_1 \cdot I_S R_S - k_2 \cdot I_0 R_0$ (where the dimensionless constants $k_1$ and $k_2$ depend on the specific application), and applies the value of the voltage as obtained in this way to the inverting input of Ac via a diode D4. This ensures that the signal $V_{COND}$, and consequently the output signal $I_0$, cannot exceed a maximum value corresponding to the generator SA having an operating point lying within the constant current region; the current-control circuit C_COND is then said to operate under current-limiting conditions. Since the signal $V_{CTRL}$ is generally used by a plurality of different modules, the "antilocking" circuit must not be capable of changing it: that is why $V_{CTRL}$ is applied to the input of Ac via a voltage follower F2.

Like the control circuit CT, the current-control C_COND thus generates a control signal ($V_{COND}$) for the driver circuit as constituted by the comparator CP2 and the driver stage DRV, which signal causes the switch of the switching voltage converter APR to switch ON and OFF. When $V_{COND} > V_{MPPT}$, a diode D3 is non-conductive and it is the current-control circuit C_COND that determines the duty cycle D, and thus the value of the output current; conversely, when $V_{MPPT} > V_{COND}$, it is the control circuit CT that takes over. It can be seen that when the signal MPPT-INAC is high, $V_{MPPT}$ is forced to the negative saturation voltage of the integrator INT: consequently the diode D3 is non-conductive and the converter APR is controlled by the current-control circuit C_COND. It is thus shown that MPPT-INAC is indeed a signal for inactivating the control circuit CT.

In a preferred embodiment of the invention, the control circuit CT is not active continuously, but only when it is actually necessary for the photovoltaic generator SA to be capable of generating maximum power. Activation and deactivation of the circuit CT is controlled by a detector circuit DET, which may be constituted merely by comparator with hysteresis, having one input receiving $V_{CTRL}$ and another input receiving a reference voltage Ref. When $V_{CTRL}$ drops below a first threshold, the output MPPT-INAC from DET switches from a high level to a low level, thereby unblocking the Q output of the bistable B1. The signal MPPT-INAC returns to its high level only when $V_{CTRL}$ increases above a second threshold that is higher than said first threshold. This hysteresis ensures that mere fluctuations in $V_{CTRL}$ do not lead to repeated activations and deactivations of the control circuit CT.

FIG. 4 also shows current detector circuits CC1 and CC2 that generate the voltage signals $I_0 R_0$ and $I_S R_S$ as a function respectively of the output current $I_0$ and of the switching current $I_S$ of the voltage converter APR.

Figure 5:
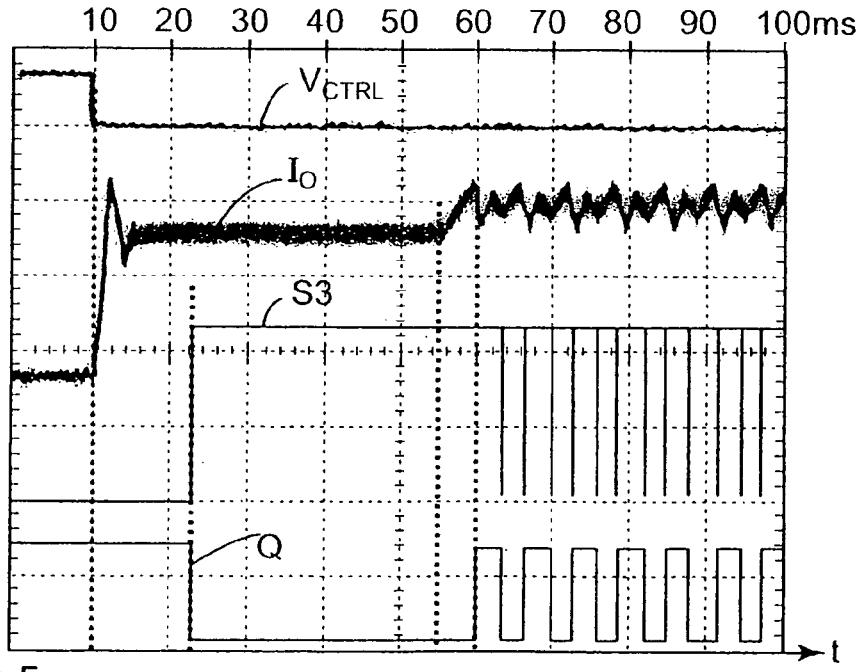
FIGS. 5 and 6, waveforms illustrating the operation of the FIG. 4 module.

FIG. 5 shows how the module of FIG. 4 responds to a decrease in the signal $V_{CTRL}$, which corresponds to a drop in the potential of the power supply bus bar BDP.

It is assumed that initially, while $t < T_0$, the control circuit CT is inactivate (MPPT-INAC at a high logic level, so $V_{MPPT}$ at the negative saturation value of the integrator INT, and the diode D3 non-conductive), and that the signal $V_{CTRL}$ has a relatively high value, meaning that the current $I_{SA}$ generated by the photovoltaic generator SA, which is not at its maximum efficiency operating point, is nevertheless sufficient.

At instant $t = T_0$, $V_{CTRL}$ decreases: a greater current $I_{SA}$ therefore needs to be extracted from the generator SA. The current-control circuit C_COND responds by increasing its output $V_{COND}$ so as to decrease the duty cycle D of the signal driving the voltage converter APR, and thus increase the output current $I_0$ from said converter. In the specific example, this increase in output current is large enough to lead to intervention of the antilocking circuit ALK: the current-control circuit C_COND thus embarks on current-limiting operation.

At instant $T_1$, the detector circuit DET responds to the decrease in $V_{CTRL}$ by allowing the control circuit CT to be activated: consequently, the Q output of the bistable B1 switches to its low logic state. The delay $T_1-T_0$ (of about 13 milliseconds (ms) in the specific example described) is introduced deliberately, in particular by means of a lowpass filter on the input of $V_{CTRL}$ to the detector circuit DE: in this way, the circuit CT is activated only if the response of the current-control circuit C_COND is not sufficient for countering the drop in the potential of the bus bar. After the control circuit CT has been activated, the integrator INT leaves negative saturation and $V_{MPPT}$ begins to increases linearly; when at instant $T_2$, $V_{MPPT}$ exceeds $V_{COND}$, the diode D3 becomes conductive and the circuit CT takes control of the converter APR: the oscillating conditions illustrated in FIG. 3 can thus be established, with the oscillation having a period of about 6 ms (167 Hz); the point $T_3$ corresponds to the instant at which the operating point of the photovoltaic generator exceeds the optimum point MPP for the first time: about 50 ms elapse between $V_{CTRL}$ decreasing at time $T_0$, and entering into maximum power extraction conditions. For proper overall operation, it is important that even at the lowest point of the oscillation, $V_{MPPT}$ is greater than the value taken by the signal $V_{COND}$ when the current-control circuit C_COND is operating in current-limiting conditions.

The diode D3 connects the control circuit CT and the current-control circuit C_COND to the driver circuit CP2-DRV in such a manner that the input of the driver circuit receives that one of the two driver signals $V_{MPPT}$ and $V_{COND}$ that corresponds to the higher level for output current from the voltage converter APR.

Particularly in space applications, it is possible for the module to be found in an abnormal situation in which the output current $I_0$ from the converter APR is low while the control circuit CT is active. A reinitialization circuit RI provided for this purpose then temporarily deactivates the control circuit CT so that the current-control circuit C_COND can take over. Thereafter, the reinitialization circuit RI returns the signal MPPT-INAC to a low level, thereby enabling the control circuit CT to be reactivated.

Figure 6:
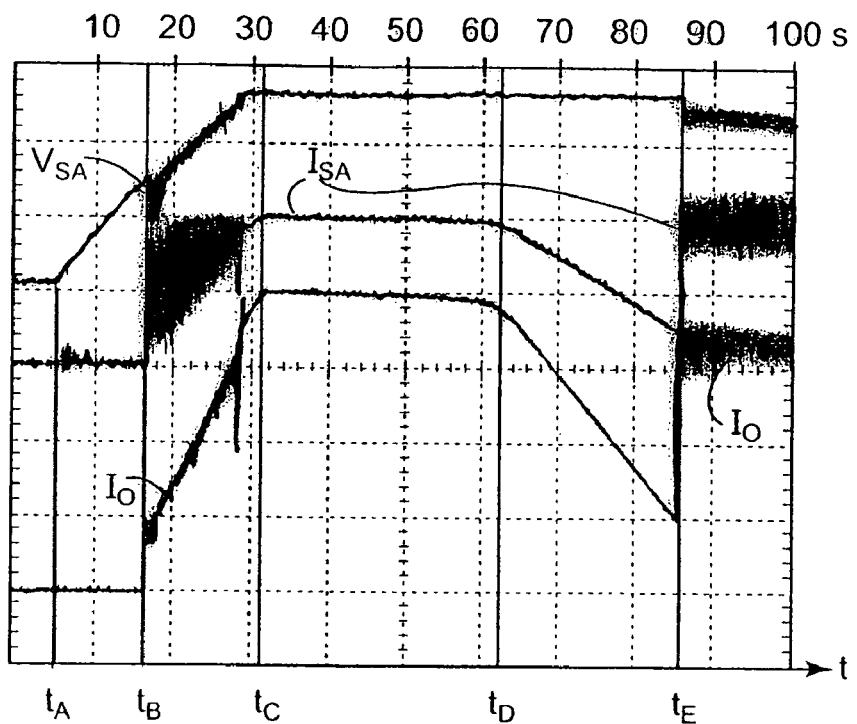

One situation in which an intervention is required from the reinitialization circuit RI is constituted by a solar generator of a satellite passing from an eclipse condition to an illuminated condition, i.e. to a situation of the kind shown in FIG. 6.

Initially, for $t < t_A$, no solar radiation illuminates the photovoltaic generator SA: consequently, the voltage $V_{SA}$ across its terminals is zero, as is the current it generates $I_{SA}$ and the output current from the converter APR; the potential of the power supply bus bar is maintained at a constant level $V_{BUS}$ by power supply batteries. At instant $t_A$, the generator begins to be illuminated by solar radiation: the voltage $V_{SA}$ across its terminals begins to increase rapidly, while the current $I_{SA}$ increases much more slowly. At instant $t_B$, when $V_{SA}$ exceeds a certain value (40 V in the example described), the converter APR begins to transfer maximum power, since the detector circuit DET recognizes that it is necessary to activate the control circuit CT in order to recharge the batteries that have been partially discharged during the eclipse period. However, since said generator is still very cold, its optimum operating point MPP corresponds to a voltage $V_{SA} > V_{BUS}$. Since the converter APR is a step-up switching converter, this condition cannot be achieved and the voltage $V_{SA}$ remains locked to the value $V_{BUS}$. Between $t_C$ and $t_D$, as the generator warms up, its open-circuit voltage decreases, but remains greater than $V_{BUS}$. Starting from instant $t_D$, $V_{SA}$ drops below $V_{BUS}$, but the control circuit CT is still not capable of reaching the optimum operating point: the progressive variation in the V-I characteristic of the generator SA causes it to operate in the constant-voltage region of said characteristic, so it is blocked around a stable operating point in said region. As the generator SA continues to warm up, the values of the currents $I_0$ and $I_{SA}$ decrees steeply. At instant $t_E$, the decrease in $I_0$ triggers intervention by the reinitialization circuit RI which causes the control circuit CT to be deactivated and then reactivated. As a result of this intervention, the control circuit CT manages to cause the generator SA to operate around its maximum power point MPP and the currents $I_{SA}$ and $I_0$ rise quickly to their highest possible levels, given the intensity of the solar radiation and the temperature of the generator SA.

It should be observed that the time scale of FIG. 6 is very different from that of FIG. 5: about 80 seconds (s) elapse between starting to leave an eclipse ($t_A$) and maximum power extraction conditions becoming established ($t_E$).

Figure 7:
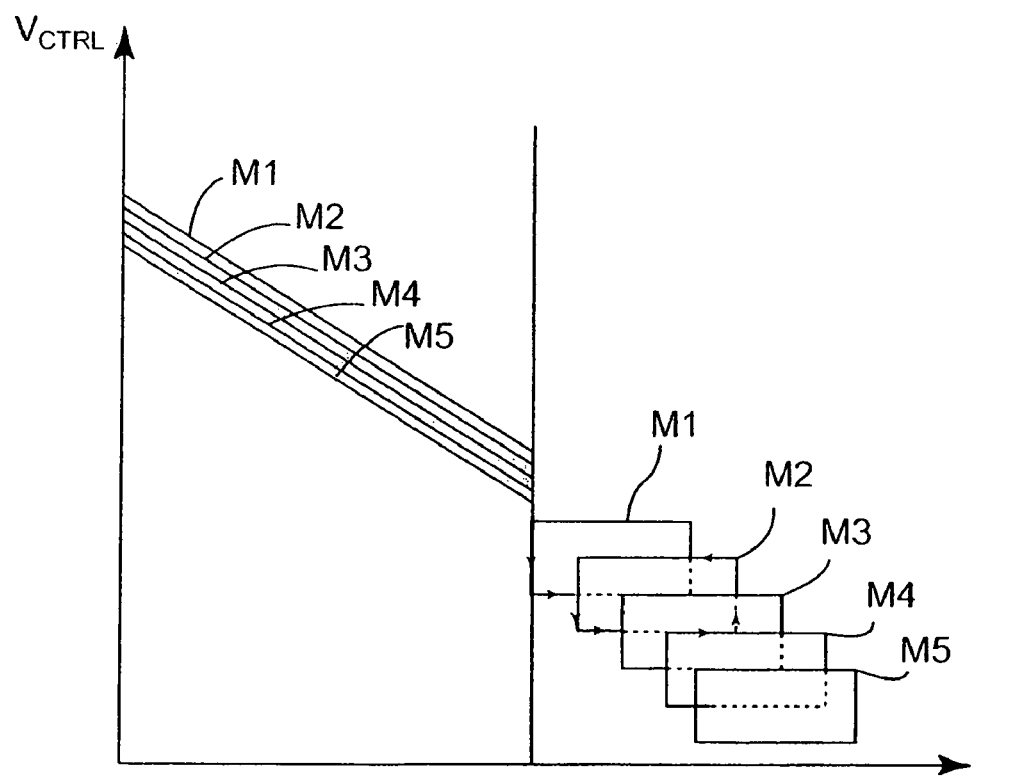
FIG. 7, a diagram illustrating the operation of a photovoltaic generator system comprises a plurality of modules of the type shown in FIG. 4.

A complete photovoltaic generator system may comprise a plurality of individual photovoltaic generators SA connected in parallel to the power supply bus BDP, each of the generators being controlled by a control module of the type shown in FIG. 4. Advantageously, the various modules present different thresholds for activating their control circuits CT, as shown in FIG. 7, which shows the operating principle of a system having five modules M1 to M5. The modules receive as inputs the same signal $V_{CTRL}$ (which is a function of the potential of the common power supply bus bar BDP) and they also receive respective signals $I_0 R_0^1$ to $I_0 R_0^5$ (functions of the current output by each converter APR).

When $V_{CTRL}$ is high enough, in all of the modules M1 to M5 the control circuit CT is inactivated and the output current is controlled by the current-control circuit C_COND (the curves of $V_{CTRL}$ plotted as a function of $I_0^1$ to $I_0^5$ are shown as being offset a little, but that is not essential).

When $V_{CTRL}$ drops below a certain threshold, the antilocking circuits ALK of the various modules intervene and the output currents $I_0^1$ to $I_0^5$ become independent of $V_{CTRL}$ (current-limiting condition). If $V_{CTRL}$ drops even further, then the detector circuit DET of the first module M1 causes the corresponding control circuit CT to be activated. This leads to a significant increase in the output current $I_0^1$, which takes on its highest possible value. If $V_{CTRL}$ continues to decrease, the modules switch one after another to conditions for maximizing output current.

In the example described, after the control circuit CT of the second module M2 has been activated, $V_{CTRL}$ begins to increase. Because of the hysteresis of the detector circuit DET, as represented by the vertical sides of the rectangles drawn in FIG. 7, the module M2 remains under conditions for maximizing output current until the increase in $V_{CTRL}$ reaches a certain threshold. The arrows on said FIG. 7 serve to follow the variation of the system over time.

It can be advantageous to compare the operation of a photovoltaic generator system of the invention with a system based on the conventional $S^3R$ technique. In the method of the invention, when $V_{CTRL}$ is relatively low, some of the modules (M1) are operating in conditions of maximizing output current, while other modules (M3-M5) are operating in current-limiting conditions, and one of the modules (M2) is switching between those two conditions in order to provide fine adjustment of the power delivered. In contrast, with the $S^3R$ system, some of the modules are short-circuited and are therefore not generating power, while others are connected to the power bus bar, but are generally not operating at their optimum operating points, with one of the modules switching between those two conditions in order to provide fine adjustment.

It can be understood from FIG. 7 that the greater the difference between the current-limiting conditions of the current-control circuit C_COND and maximum power conditions, the greater the transient due to activating the control circuit CT. In the limit, it is possible to envisage eliminating said current-control circuit and to control power solely with the help of the hysteresis of the detector circuit DET, however under such circumstances the transients would be too great and the quality of the power supply would be degraded.

The invention is described above with reference to a particular application, namely a system for supplying solar energy to a space vehicle, however the invention is not limited thereto. The control circuit CT can be used in entirely general manner to control a switching voltage converter (buck or step-up) connected to a power generator in order to maximize the current delivered, and need not necessarily form part of a control module as shown in FIG. 4. Furthermore, the structural details of the circuit CT are not critical and variants are possible. The control module can in turn be adapted to generators other than solar generators, and need not necessarily include all of the elements described; in particular, the reinitialization circuit RI is specific to space applications and might not be necessary under other circumstances. In addition, although the use of a step-up switching converter for the voltage converter is particularly advantageous in the application described, obvious modifications make it possible to use other types of converter.

What is claimed is:

1. A control circuit for a switching DC/DC Converter comprising:
    an input for an indicator signal indicative of an output current level from said converter;
    a peak detector for detecting and storing a maximum value of said indicator signal;
    a comparator element for comparing an instantaneous value of said indicator signal with said stored maximum value, and for generating a switching signal when said instantaneous value becomes less than a predetermined fraction of said stored value;
    reinitializer means for reinitializing said peak detector in response to said switching signal; and
    means for generating a control signal that switches between a state in which it increases over time and a state in which it decreases over time in response to said switching signal.

2. A circuit according to claim 1, in which said control signal varies linearly with time.

3. A circuit according to claim 1:
    also including an input for an activation and deactivation signal; and
    in which, while a deactivation signal is present on said input, said control signal is blocked in a saturated state.

4. A control module for a photovoltaic generator, the module comprising:
    a switching DC/DC Converter connecting said photovoltaic generator to a power supply bus bar;
    a current detector for generating an indicator signal indicative of an output current from said converter;
    a driver circuit connected to said receive a control signal as an input and to generate a signal for driving said DC/DC Converter as a function of said control signal; and
    a control circuit according to claim 1, connected to receive said indicator signal as an input and to generate on its output a first control signal for the driver circuit.

5. A module according to claim 4, in which said DC/DC Converter is a step-up switching converter.

6. A module according to claim 4, in which said driver circuit comprises a pulse width modulator for generating a driver signal having a duty cycle determined by said control signal.

7. A module according to claim 4:
also comprising a current-control circuit for generating a second control signal for said driver circuit such that the output current from said DC/DC Converter is maintained at a target level that increases with decreasing value of the potential of said power supply bus bar; and
in which said control circuit and said current-control circuit are connected to said driver circuit in such a manner as to receive as input that one of said first and second control signals that determines generating the driver signal that corresponds to the higher level for the output current from said DC/DC Converter.

8. A module according to claim 7, in which said current-control circuit is a conductance control circuit.

9. A module according to claim 7, in which said current-control circuit includes a limiter circuit for limiting the value of said second control signal for said driver circuit in such a manner that said target level for the output current from the DC/DC Converter cannot exceed a limit value regardless of the value of the potential of said power bus bar.

10. A module according to claim 9, also including an activator and deactivator circuit for generating a signal for activating said control circuit when the value of the potential of said power supply bus bar drops below an activation threshold, and for generating a signal for deactivating said control circuit when the value of the potential of said power supply bus bar rises above a deactivation threshold, higher than said activation threshold.

11. A photovoltaic generator system comprising a plurality of individual photovoltaic generators isolated from one another and connected to a common power supply bus bar via respective control modules according to claim 10, in which:
the circuits for activating and deactivating each module present different values for said activation and deactivation thresholds; and
said activation threshold, for all of the modules, is less than the value of the potential of said power supply bus bar at which said target level for the output current from said DC/DC Converter is equal to said predetermined limit value.

12. A method of controlling a switching DC/DC Converter in such a manner that its output current oscillates about its maximum value, the method comprising the following operations:
generating a control signal for controlling said DC/DC Converter, which control signal can present a state in which it increases over time or a state in which it decreases over time;
continuously acquiring an indicator signal indicative of an output current level from said DC/DC Converter;
continuously detecting a peak value of said indicator signal and storing it in a storage element;
continuously comparing the present value of said indicator signal with said stored peak value; and
when said present value is less than a first predetermined fraction of said stored peak value:
reinitializing said storage element; and
switching said control signal between said state of increasing relative to time and said state of decreasing relative to time.

* * * * *